United States Patent
Hill

(10) Patent No.: US 10,306,990 B2
(45) Date of Patent: Jun. 4, 2019

(54) ADJUSTABLE SEAT OCCUPANT SUPPORT ASSEMBLY

(71) Applicant: Milsco Manufacturing Company, a unit of Jason Incorporated, Milwaukee, WI (US)

(72) Inventor: Kevin Hill, Mequon, WI (US)

(73) Assignee: Milsco Manufacturing Company, A Unit of Jason Incorporated, Milwaukee, WI (US)

( * ) Notice: Subject to any disclaimer, the term of this patent is extended or adjusted under 35 U.S.C. 154(b) by 18 days.

(21) Appl. No.: 15/119,500

(22) PCT Filed: May 19, 2015

(86) PCT No.: PCT/US2015/031650
§ 371 (c)(1),
(2) Date: Aug. 17, 2016

(87) PCT Pub. No.: WO2015/179456
PCT Pub. Date: Nov. 26, 2015

(65) Prior Publication Data
US 2017/0055712 A1 Mar. 2, 2017

Related U.S. Application Data

(60) Provisional application No. 61/994,993, filed on May 19, 2014, provisional application No. 62/000,525, filed on May 20, 2014.

(51) Int. Cl.
*A47C 3/00* (2006.01)
*A47C 7/46* (2006.01)
*B60N 2/66* (2006.01)

(52) U.S. Cl.
CPC .............. *A47C 7/462* (2013.01); *B60N 2/667* (2015.04)

(58) Field of Classification Search
CPC ........ B60N 2/667; B60N 2/66; B60N 2/6671; B60N 2/6673; A47C 7/462
(Continued)

(56) References Cited

U.S. PATENT DOCUMENTS

| 4,632,454 A | 12/1986 | Naert |
| 5,462,335 A | 10/1995 | Seyler |

(Continued)

FOREIGN PATENT DOCUMENTS

| EP | 0 322 535 A1 | 7/1989 |
| EP | 1874252 | 5/2013 |
| WO | 0060981 A1 | 10/2000 |

OTHER PUBLICATIONS

EP Search Report dated Dec. 19, 2017 in corresponding EP App. No. 15 79 5523.

*Primary Examiner* — Chi Q Nguyen
(74) *Attorney, Agent, or Firm* — Boyle Fredrickson S.C.

(57) ABSTRACT

An adjustable seat occupant assembly for a vehicle seat including an elongate beam spring with an inline slider mechanism at its proximal end that displaces an beam spring flexor, e.g., elongate strap or link, operatively connected to a distal end of the spring to change the amount of flexure and prominence during adjustment to adjust support. In one embodiment, the mechanism is an inline slider crank mechanism carried by a drive carriage extending from the proximal end that rotates a crank when a knob is turned reciprocating the flexor between a fully retracted position where flexure is maximum and a fully extended position flexure is minimum. In another preferred embodiment, the mechanism is an inline slider cam-follower mechanism with a cam rotated by the knob to slidably displace a translating follower yoke that moves the flexor to change spring flexure.

30 Claims, 16 Drawing Sheets

(58) Field of Classification Search
USPC .............................. 297/284.4, 284.8, 284.1
See application file for complete search history.

(56) References Cited

U.S. PATENT DOCUMENTS

| | | | | |
|---|---|---|---|---|
| 5,769,490 A * | 6/1998 | Falzon | ..................... | B60N 2/66 297/284.3 |
| 5,934,752 A | 8/1999 | Klingler | | |
| 6,056,360 A | 5/2000 | Schneider | | |
| 6,179,384 B1 * | 1/2001 | DeKraker | .............. | A47C 7/441 297/284.1 |
| 6,254,186 B1 * | 7/2001 | Falzon | ................. | B60N 2/6673 297/284.1 |
| 6,412,868 B1 * | 7/2002 | Kuster | ..................... | B60N 2/66 297/284.4 |
| 6,644,740 B2 * | 11/2003 | Holst | ................... | B60N 2/0232 297/284.4 |
| 7,425,036 B2 * | 9/2008 | McMillen | ........... | B60N 2/6671 297/284.4 |
| 7,748,783 B2 * | 7/2010 | Kinoshita | ................. | A47C 7/46 297/284.1 |
| 7,780,233 B2 * | 8/2010 | McMillen | ........... | B60N 2/6673 297/284.4 |
| 7,823,975 B2 * | 11/2010 | Prause | ................. | B60N 2/6671 297/284.4 |
| 7,854,479 B2 * | 12/2010 | Mundell | ................ | A47C 7/465 264/261 |
| 8,162,399 B2 * | 4/2012 | Demontis | ................ | B60N 2/66 297/284.1 |
| 2003/0085600 A1 * | 5/2003 | Mori | ...................... | B60N 2/667 297/284.4 |
| 2005/0017555 A1 * | 1/2005 | Elliot | ................... | B60N 2/6671 297/284.4 |
| 2009/0236889 A1 | 9/2009 | Prause et al. | | |
| 2009/0256407 A1 | 10/2009 | Beyer et al. | | |
| 2010/0066136 A1 | 3/2010 | D'Agostini | | |
| 2010/0066143 A1 | 3/2010 | Schweizer et al. | | |
| 2011/0115268 A1 | 5/2011 | Maierhofer et al. | | |
| 2012/0074744 A1 | 3/2012 | Ghisoni et al. | | |
| 2012/0217778 A1 | 8/2012 | Okamoto et al. | | |
| 2012/0274119 A1 | 11/2012 | Beyer et al. | | |
| 2013/0001993 A1 | 1/2013 | Kurata et al. | | |
| 2013/0154326 A1 | 6/2013 | Maierhofer et al. | | |
| 2014/0077542 A1 | 3/2014 | Vander Veen et al. | | |
| 2014/0100503 A1 | 4/2014 | Liao | | |
| 2014/0346828 A1 | 11/2014 | Gaither et al. | | |
| 2015/0144675 A1 | 5/2015 | Losos et al. | | |

\* cited by examiner

ADJUSTABLE SEAT OCCUPANT SUPPORT ASSEMBLY

CROSS REFERENCE

This application claims all benefits to and priority in U.S. Provisional Application Ser. No. 61/994,993, filed on May 19, 2014, and in U.S. Provisional Application No. 62/000,525, filed on May 20, 2014, the entirety of each of which is hereby expressly incorporated by reference herein.

FIELD

The present invention is directed to an adjustable seat support assembly for enabling selective adjustment of seat occupant comfort and more particularly to an adjustable crank-driven seat occupant support assembly that is particularly well suited for use in providing lumbar support.

BACKGROUND

In the past, seats have been constructed with a wide variety of mechanisms and arrangements configured to enable adjustment to improve comfort of seat occupants having a wide variety of shapes, sizes and weights. As discussed in the background section of commonly owned U.S. Pat. No. 8,052,213, various types of adjustable pneumatic and mechanical seat occupant support assemblies have been employed in the past that seek to provide adjustable support to the lumbar region of the back of a seat occupant to improve comfort. While many of these have proven to be very effective, improvements nonetheless remain desirable.

Pneumatic lumbar adjustment assemblies tend to be complicated, expensive and often require a significant amount of space, including in certain instances space off-board the seat, to implement. Pneumatic assemblies typically require many additional costly components including an air bladder located inside the seat that is connected by tubing to controls manipulable by a seat occupant to operate an air pump to inflate the bladder when it is desired to increase lumbar support, and to deflate the bladder when it is desired to decrease lumbar support. Cheaper pneumatic assemblies typically employ a manually operated control valve, such as an inline needle-type valve, which can be opened to deflate the bladder and closed before a manual squeeze bulb pump is used to inflate the bladder. More expensive pneumatic assemblies require electrical power and control switches and/or valves to operate an electrically powered pump or air compressor that can and typically does charge one or more pneumatic compressed air storage cylinders during use and operation.

While cheaper, mechanical lumbar adjustment assemblies also tend to be complicated and often require many parts which undesirably increases assembly time and costs. Mechanical assemblies have long used flexible beam springs made of metal, e.g., spring steel, or plastic and are operated using complicated and costly actuating mechanisms including cable, clutch-connecting rod, and slow-to-adjust screw mechanisms. In addition to being complicated and costly, these lumbar adjustment assembly actuating mechanisms unfortunately impose significant limitations on seat designers as they inherently limit the number of locations where the controls a seat occupant uses to operate them can be located.

While many of these adjustable seat occupant support assemblies have enjoyed commercial success in the past, their complexity, cost and other limitations has limited more widespread application. As a result, adjustable lumbar supports remain an optional and costly accessory such that they are typically included only on a minority of seating products.

SUMMARY

The present invention is directed to an adjustable seat occupant support assembly constructed in accordance with the present invention that is constructed and arranged to provide adjustable resilient support to part of the body of an occupant of a seat equipped with the adjustable seat occupant support assembly. A preferred seat occupant support assembly is an adjustable lumbar assembly that is mounted to or otherwise carried by a portion of a frame or pan of a backrest of a seat that can be a vehicle seat or another type of seat or chair.

The adjustable lumbar assembly includes a resiliently bendable elongate beam spring whose amount of flexure is adjusted via displacement of an elongate beam spring flexor that extends from a distal end of the beam spring and is operatively connected at or adjacent a distal end of the beam spring. Extending outwardly from a distal end of the beam spring is a lumbar adjustment actuator that preferably is a lumbar adjustment drive with an inline slider mechanism that slidably reciprocates the beam spring flexor relative to the beam spring to change the amount of flexure, e.g., amount of bending and/or radius of curvature, of the beam spring by shortening or increasing the effective length of the beam spring. The inline slider mechanism cooperates with an external manipulable actuator external to the seat that preferably is a handle, e.g., knob, to displace, e.g., reciprocate, the beam spring flexor relative to the beam spring to change effective beam spring length thereby changing flexure and the amount of support provided by the beam spring to a seat occupant.

A preferred beam spring has a drive carriage outwardly extending from its proximal end that carries the actuator or drive that preferably is an in-line slider mechanism disposed in-line with a longitudinal extent of the beam spring that displaces the beam spring flexor when the drive is actuated. The beam spring also has a beam spring flexor guide arrangement that includes a pair of spaced apart flexor guides that preferably are either a guide slot or a guide channel. The beam spring has a pair of spaced apart supports disposed at opposite end that bridge the pre-curved being spring against an inner surface of part of the frame or pan of the seat. A preferred beam spring has another support disposed therebetween that spaces a generally centrally located curved portion of the beam spring away from the seat frame or seat pan.

In one preferred embodiment, the drive carriage carries an in-line slider mechanism that preferably is an in-line slider crank mechanism having a rotary crank wheel that preferably is a ratchet gear with a crank pin that reciprocates the spring beam flexor during support adjustment to increase or decrease support by changing beam spring flexure or bend curvature. In another preferred embodiment, the drive carriage carries an in-line cam-follower mechanism with a cam rotatively received in a translating follower yoke slidably coupled to an elongate generally planar in-line slider seat extending outwardly from the proximal end of the beam spring. The cam has a plurality of pairs of circumferentially spaced apart radial detents or stops that a follower extending radially inwardly from an outer sidewall of the yoke rides along enabling discrete position adjustment of beam spring effective length and flexure.

These and various other features, aspects, and advantages of the present invention will be made apparent from the following descriptions of the drawings and detailed description.

DRAWING DESCRIPTION

One or more preferred exemplary embodiments of the invention are illustrated in the accompanying drawings in which like reference numerals represent like parts throughout and in which.

Figure 14:
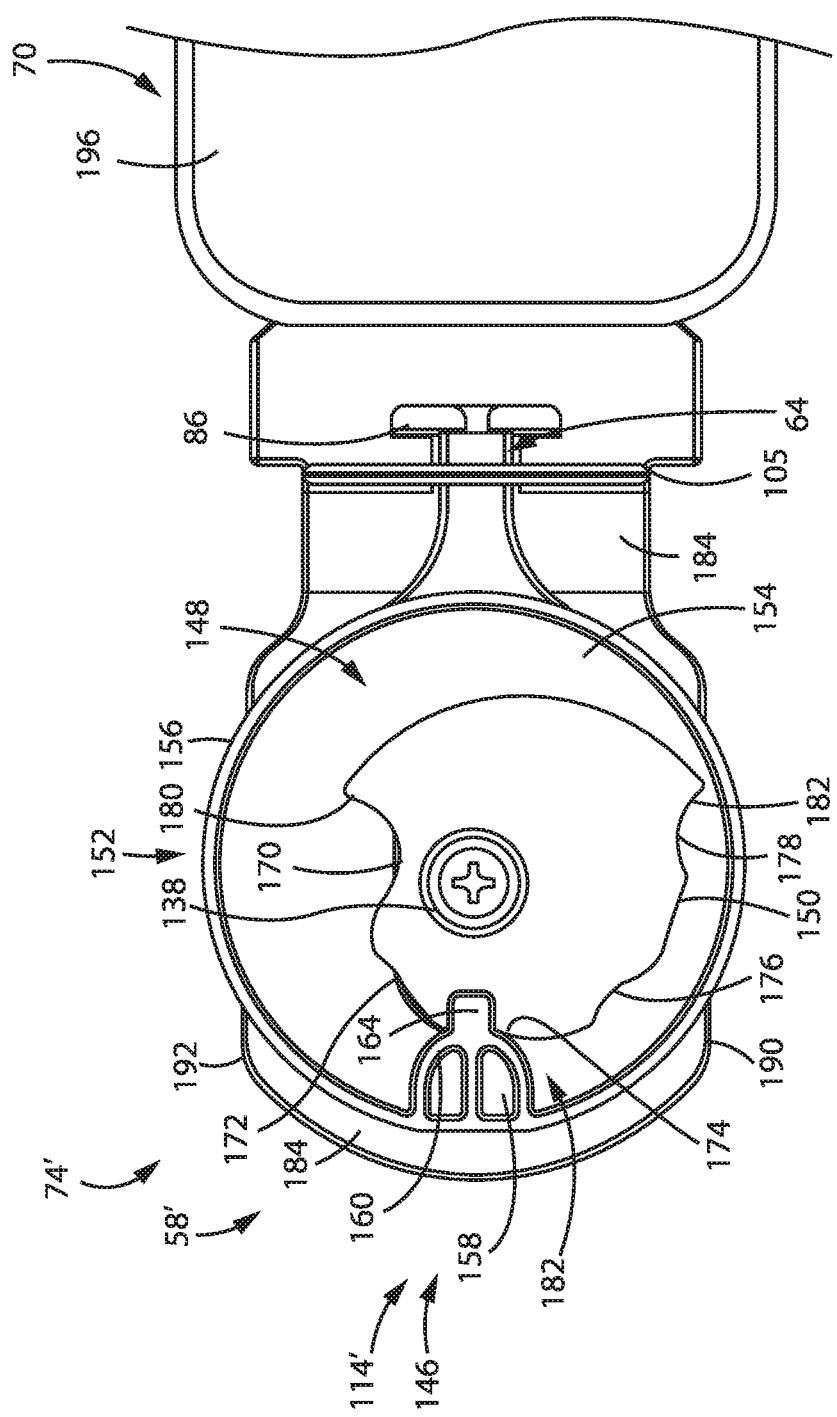
Figure 15:
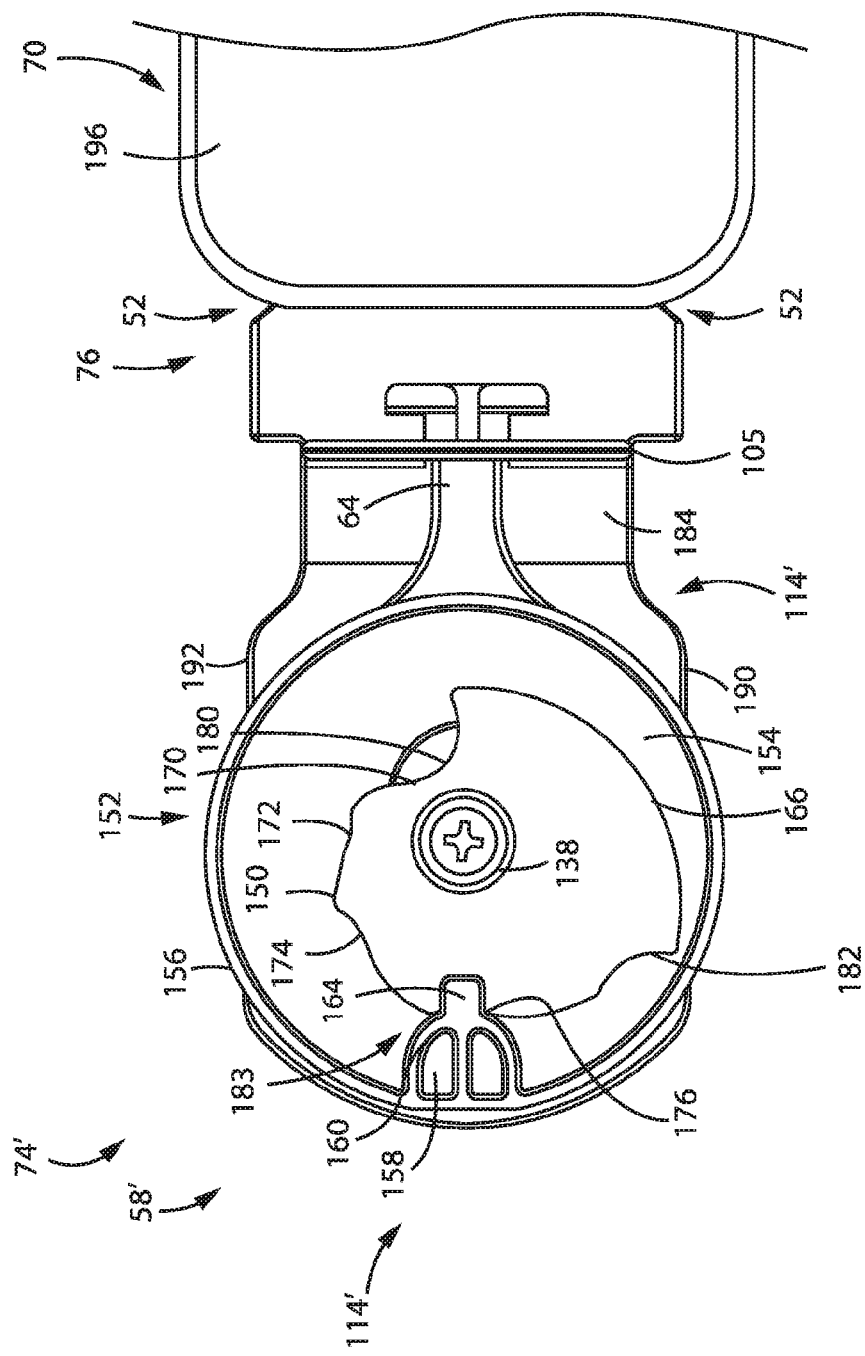
Figure 16:
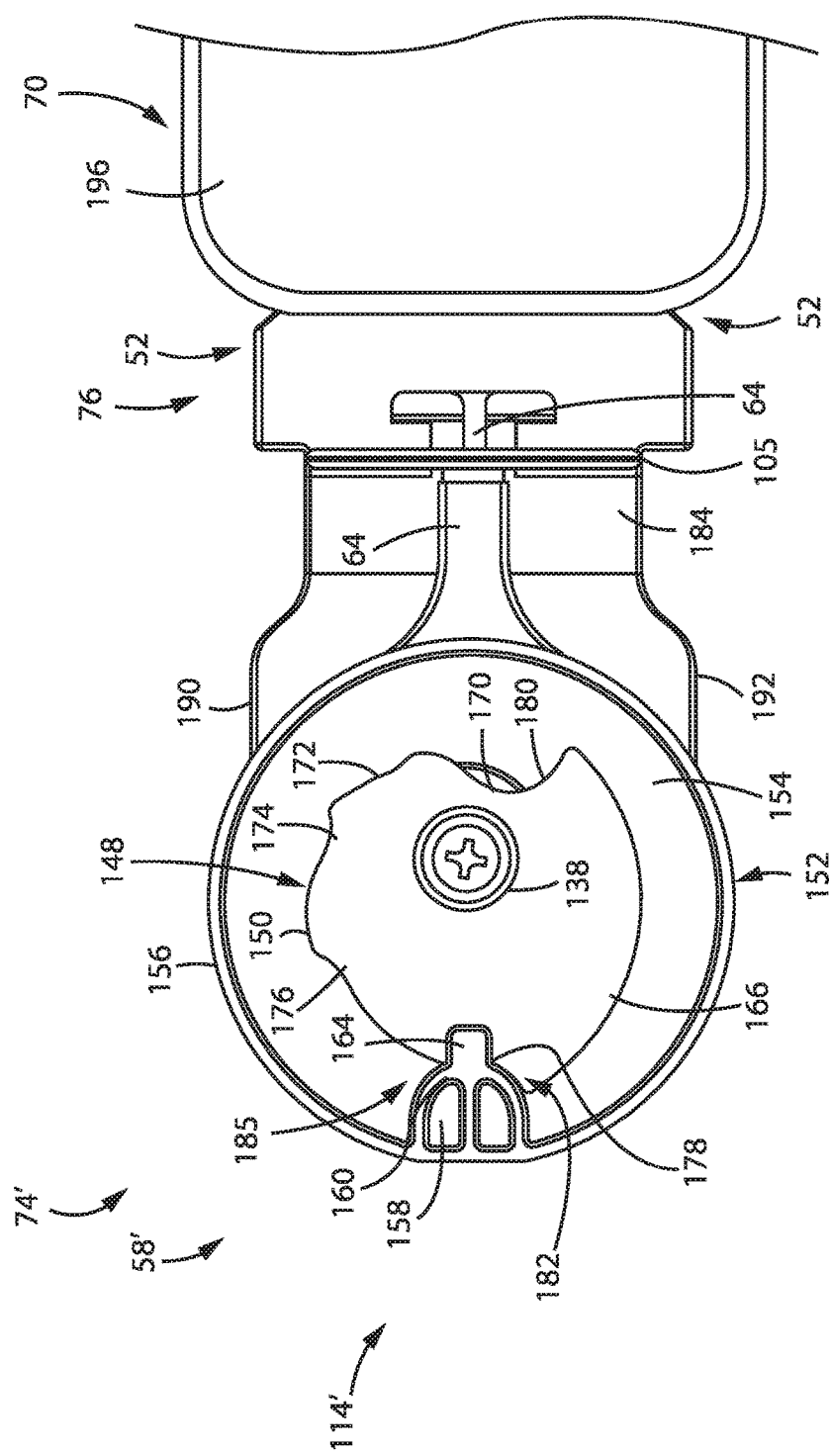

FIG. 14 is a third fragmentary front elevation view of the inline slider cam-and-follower mechanism depicting the reciprocable beam flexor in a third position displaced away from the second position and farther away from the fully extended position further shortening the effective length of the beam spring thereby further increasing beam spring flexure, prominence, and the amount of support provided by the beam spring to a seat occupant;

FIG. 15 is a fourth fragmentary front elevation view of the inline slider cam-and-follower mechanism depicting the reciprocable beam flexor in a fourth position displaced away from the third position, farther away from the second position, and even farther away from the fully extended position even further shortening the effective length of the beam spring thereby even further increasing beam spring flexure, prominence, and the amount of support provided by the beam spring to a seat occupant; and FIG. 16 is a fifth fragmentary front elevation view of the inline slider cam-and-follower mechanism depicting the reciprocable beam flexor in a fifth position substantially full retracted position displaced away from the fourth position, farther away from the third position, even farther way from the second position, and even farther away from the fully extended position even further shortening the effective length of the beam spring thereby even further increasing beam spring flexure, prominence, and the amount of support provided by the beam spring to a seat occupant.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-6 illustrate a first preferred embodiment of an adjustable seat occupant support assembly 40, preferably an adjustable lumbar assembly 42, constructed in accordance with the present invention that is mounted to a portion of a frame or pan 44 of a backrest 46 of a seat 48 that preferably is a vehicle seat 50, e.g., off-road vehicle seat. The adjustable lumbar assembly 42 includes an elongate flexible lumbar support providing beam spring 52 in operable cooperation with a lumbar adjustment actuator 54 formed of a lumbar adjustment drive 56 operated by a seat occupant to change lumbar support by changing the amount of flexure or prominence of the beam spring 52. The drive 56 preferably includes an inline slider mechanism 58 driven via a handle 60 (FIGS. 2 and 3), such as a knob 62 (FIGS. 2 and 3) carried on the outside of the seat 48, manipulated by a seat occupant (not shown) to displace an elongate beam spring flexor 64 connected to a distal end 66 of the beam spring 52 to change an effective length of the beam spring 52 in order to cause the amount of outward prominence or flexure of the beam spring 52 to change during lumbar adjustment.

Figure 1:
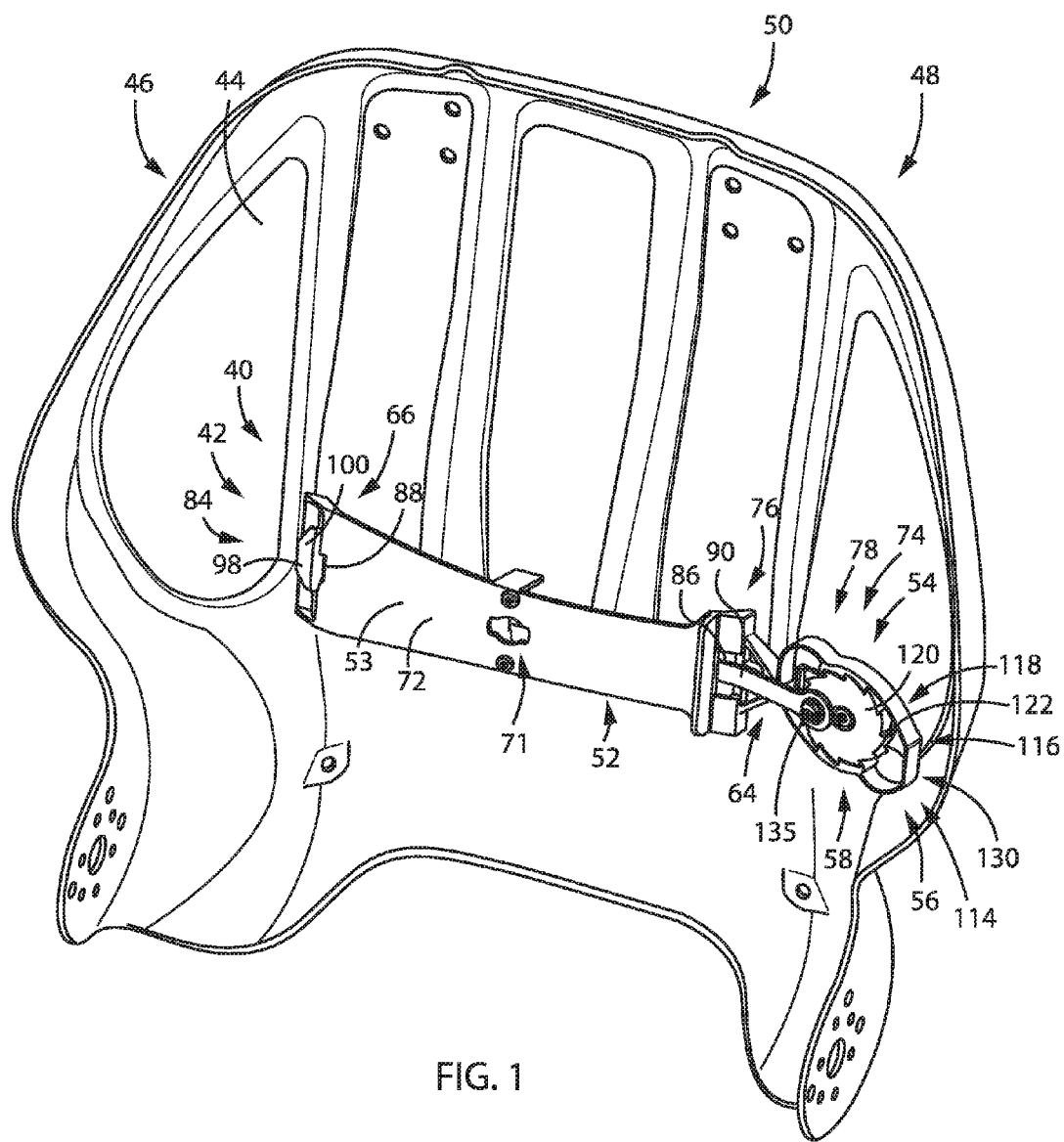
FIG. 1 is a top front perspective view of a portion of a backrest of a vehicle seat, with cushion removed for clarity, to which a first preferred embodiment of an adjustable seat occupant support assembly is attached that is configured for providing lumbar support and which employs an inline slider crank mechanism.
Figure 2:
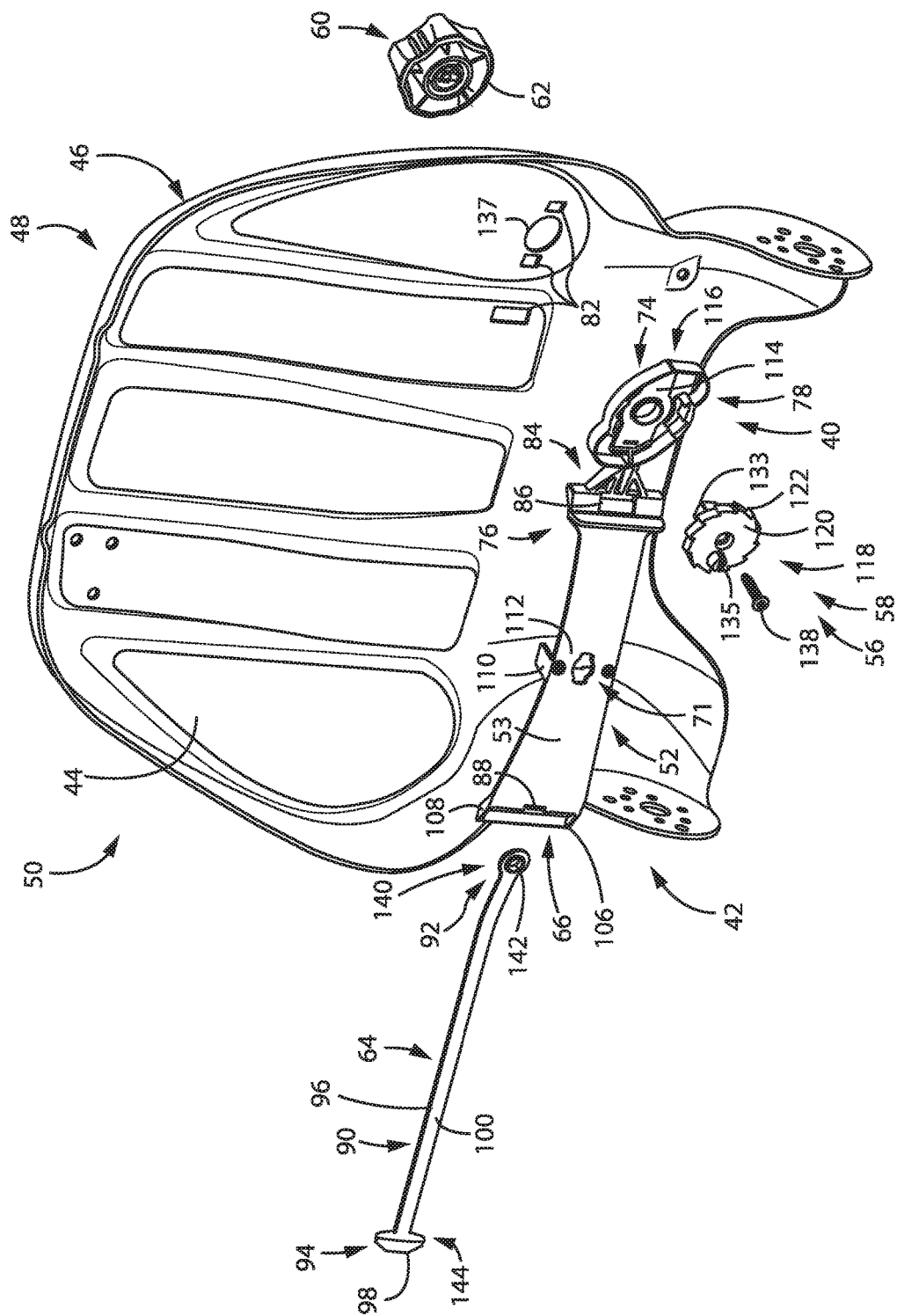
FIG. 2 is a top front perspective view of the vehicle seat with an exploded front top perspective view of the adjustable seat occupant support assembly of FIG. 1.
Figure 3:
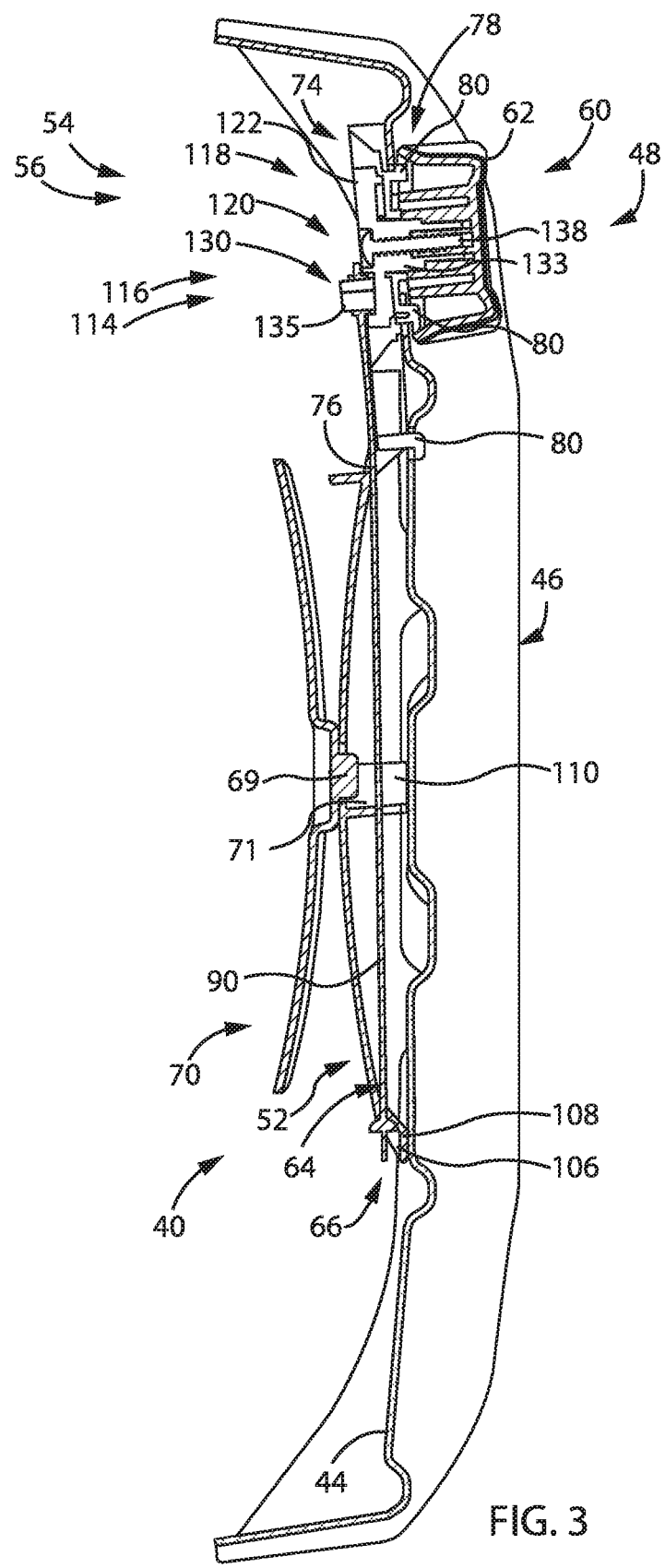
FIG. 3 is a transverse cross-sectional view of the vehicle seat backrest providing a side elevation view of the adjustable seat occupant support assembly of FIG. 1.

The beam spring 52 is an elongate leaf spring 53 of generally rectangular cross-section disposed between the frame or pan 44 of the seat 48 and at least a portion of a seat cushion 68 (shown in phantom in FIG. 3) overlying the beam spring 52 such that adjustment of the lumbar assembly 42 changes the amount of convexly curved flexure, e.g., beam spring curvature, or prominence of the beam spring 52 correspondingly increasing or decreasing the amount of lumbar support provided to a seat occupant. As is shown in FIG. 3, a concavely curved load spreading plate 70 can be attached via a coupling 69, e.g., twist-lock coupling, received in a socket 71, e.g., twist-lock socket, formed in an outer convexly curved cushion-facing surface or side 72 of the beam spring 52 locating the plate 70 between the beam spring 52 and seat cushion 68 (shown in phantom in FIG. 2). Where a load spreading plate 70 is used, the plate 70 increases the surface area of lumbar support contact with the cushion 68 to help more provide more uniform support to a seat occupant over a wider or greater area of the seat 48 and their lumbar region.

The beam spring 52 has a drive carriage 74 extending from its proximal end 76 that not only carries or houses the drive 56 but which also includes a lumbar adjustment assembly mount 78 with a plurality of spaced apart snaps 80 (FIG. 3), preferably snap hooks 81 (FIG. 4), received in corresponding snap-receiving openings 82 (FIG. 2) formed in the frame or seat pan 44 enabling snap-fit attachment of the lumbar adjustment assembly 42 as a pre-assembled unit or module to the frame or seat pan 44 during seat assembly. The beam spring 52 has a beam spring flexor guide arrangement 84 that receives and slidably guides the reciprocating beam spring flexor 64 during lumbar adjustment assembly operation. The beam spring flexor guide arrangement 84 includes a first or proximal end guide 86, preferably a guide slot 86, formed in the beam spring 52 at or adjacent the proximal end 76 of the beam spring 52 and a second or distal end guide 88, preferably a guide slot 88, formed in the beam spring 52 at or adjacent the distal end 66 of the beam spring 52 that is generally in line, e.g., generally aligned, with the first guide slot 86. If desired, one, both or all of the beam spring flexor guides 86, 88 of the beam spring flexor guide arrangement 84 can also be a guide channel formed in or of the beam spring 52.

The beam spring flexor 64 is an elongate connecting link 90 having one end, i.e., proximal end 92, in operable cooperation with the drive 56 and an opposite end, i.e., distal end 94, operatively connected to the beam spring 52 at or adjacent the distal end 66 of the beam spring 52 thereby capturing the beam spring 52 in compression and preferably in a pre-curved condition. The beam spring flexor 64 is disposed alongside the beam spring 52 and longitudinally oriented relative to the beam spring 52 with its lengthwise extent generally parallel to the lengthwise extent of the beam spring 52. The beam spring flexor 64 has an elongate body 96 narrower than the width of the beam spring 52 that extends through guides 86, 88 terminating in a wider, e.g., generally T-shaped, head or trunnion 98 at its free or distal end 94. The beam spring flexor trunnion 98 also is wider than the distal end guide slot 88 formed in the beam spring 52 at or adjacent the distal end 66 of the beam spring 52 producing an interference fit therewith that operatively connects the trunnion 98 to the beam spring 52 at or adjacent the distal end 66 of the beam spring 52. In a preferred embodiment, the beam spring flexor 64 is an elongate strap 100 made of a substantially rigid yet somewhat flexible material that preferably is a plastic, such as a nylon, or the like.

The beam spring 52 has an elongate beam spring body 101 with a beam spring flexor head or trunnion seat 102 formed therein disposed at or adjacent its distal end 66 formed by an beam spring endwall 104 and end rib 106 extending longitudinally outwardly from the endwall 104 substantially the width of the beam spring 52 that helps stiffen and/or structurally rigidify the beam spring 52 thereby opposing twisting or torsion of the beam spring 52 during lumbar adjustment assembly operation. End rib 106 also serves as a beam spring end support 108 that rests against part of the seat frame or pan 44 of the seat during operation spacing the distal end 66 of the beam spring 52 away from the seat frame or pan 44. The beam spring 52 also has a stiffening and/or structurally rigidifying generally transversely extending upraised rib 105 formed therein extending substantially the width of the beam spring 52 disposed at or adjacent its proximal end 76 and an oppositely extending support 107 that spaces the beam spring 52 from the seat frame or pan 44 at the proximal end 76. As best shown in FIG. 3, the arched resilient lumbar supporting portion of the beam spring 52 extending between the supports 107, 108 is bridged between the supports 107, 108 such that the portion of the beam spring 52 therebetween is spaced away from the seat frame or pan 44.

The beam spring 52 can and preferably also does have another beam spring support 110 disposed between the distal and proximal beam spring ends 66, 76 that extends generally transversely outwardly from a convexly outwardly curved central portion 112 of the beam spring 52 spacing at least the central portion 112 of the beam spring 52 away from the frame or seat pan 44 maintaining a gap or space therebetween. While one or both of the supports 108 and/or 110 can be attached to part of the frame or seat pan 44 via snap-fit attachment like that of the mount 78, both supports 108 and 110 preferably are configured to slidably rest against the frame or seat pan 44 without being fixed thereto enabling the supports 108 and 110 to slidably move relative to the frame or pan 44 along the frame or pan 44 during loading of the beam spring 52. Such beam spring loading can arise from a seat occupant leaning or bearing against part of the frame or pan 44 as well as from being jolted, bumped, and moved around in a manner typically encountered during seat use and vehicle operation.

The drive carriage 74 is disposed outwardly of the beam spring body 101 at or adjacent the proximal end 76 of the beam spring 52 in line with the beam spring 52 and beam spring flexor 64. The drive carriage 74 preferably includes an inline slider seat 114 in which at least a portion of the inline slider mechanism 58 that is driven by the handle 60, e.g., knob 62, is received and retained. During turning of the handle 60, e.g. rotation of the knob 62, during lumbar adjustment, the inline slider mechanism 58 reciprocates the beam spring flexor 64 back and forth between an extended position, e.g., fully extended position, where flexure of the beam spring 52 is at a minimum, e.g., minimum prominence, providing minimum lumbar support and a retracted position, e.g., fully retracted position, disposed from the extended position where flexure of the beam spring 52 is at a maximum, e.g., maximum prominence providing maximum lumbar support.

FIGS. 1-6 illustrate one preferred embodiment of an adjustable seat occupant support assembly 40 that preferably is a lumbar adjustment assembly 42 constructed in accordance with the present invention where the inline slider mechanism 58 is an inline slider crank mechanism 116 and FIGS. 7-15 illustrate another preferred embodiment an adjustable seat occupant support assembly 40' that preferably is a lumbar adjustment assembly 42' constructed in accordance with the present invention where the inline slider mechanism 58' is an inline slider cam-follower mechanism 146. The lumbar adjustment assembly 42 shown in FIGS. 1-6 equipped with the inline slider crank mechanism 116 will be described in more detail below before thereafter describing the lumbar adjustment assembly 42' shown in FIGS. 7-15 that is equipped with the inline slider cam-follower mechanism 146.

With reference once again to FIGS. 1-6, the adjustable lumbar assembly 42 has an inline slider crank mechanism 116 received in a recessed inline slider seat 114 formed in the drive carriage 74 that extends in line outwardly from the proximal end 76 of the beam spring 52. The inline slider crank mechanism 116 has a crank 118 that includes a circular or round crank wheel 120 that preferably is a toothed gear, more preferably a ratchet gear 122. The ratchet gear 122 has a plurality of pairs, i.e., at least three, radially outwardly extending teeth 124 spaced about substantially the entire circumference or periphery of the gear 122 that mate with radially inwardly teeth 126 of at least one and preferably a plurality of pawls 128 spaced on opposite sides of the gear 122 forming a ratchet 130 therewith.

Figure 6:
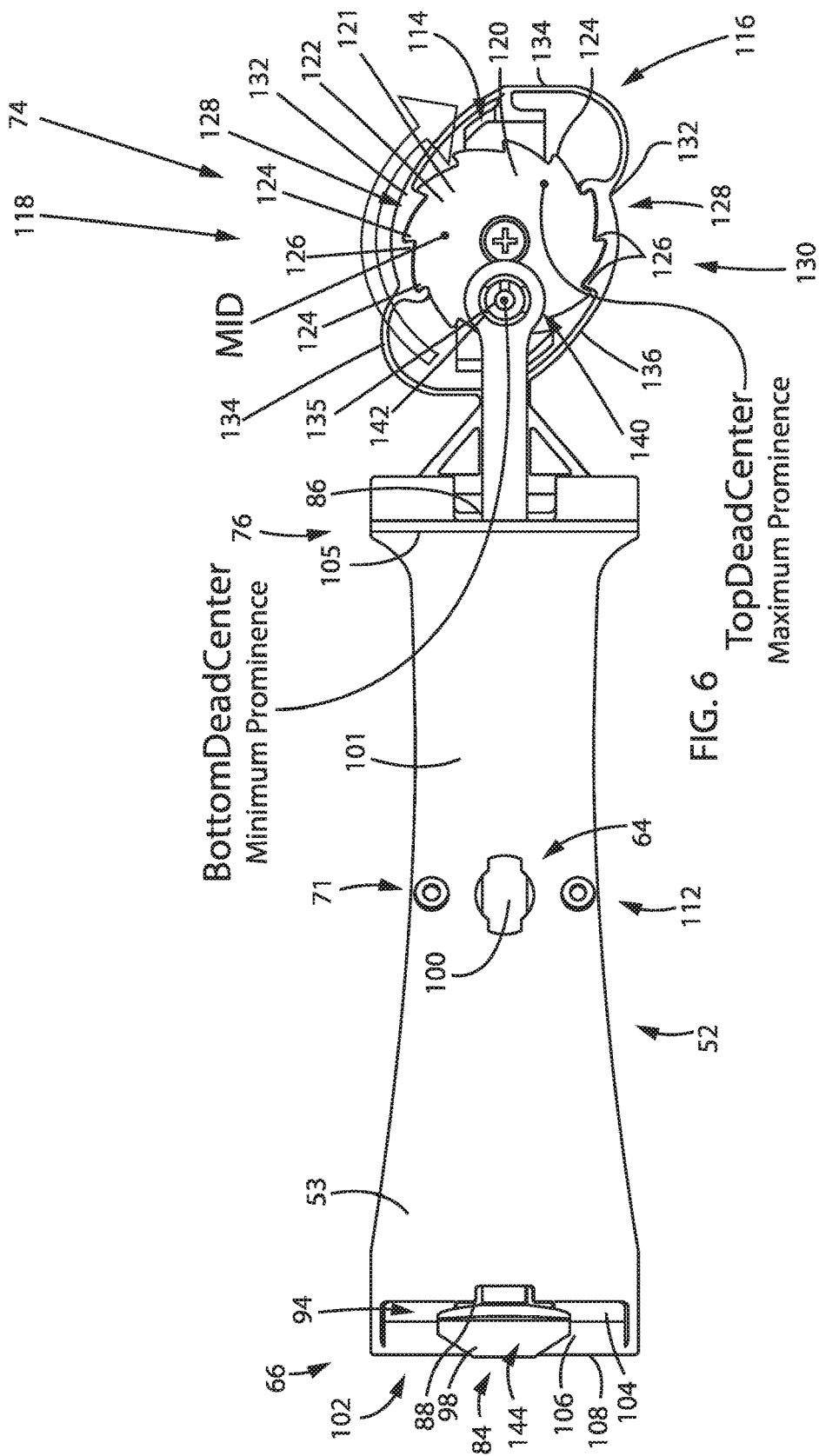
FIG. 6 is an enlarged top plan view of the adjustable seat occupant support assembly of FIG. 1.

With reference to FIG. 6, each pawl 128 preferably is an elongate curved pawl shoe 132 that is curved to substantially conform to a portion of the curved toothed radial outer periphery of the ratchet gear 122 and has at least one and preferably a plurality of ratchet gear mating teeth 126 that engage a corresponding one of the ratchet gear teeth 124 during ratchet operation. Each one of the ratchet pawls 128 is radially inwardly biased toward the ratchet gear 122 into ratchet gear engagement by a corresponding one of a plurality of curved resilient biasing elements 134, curved biasing leaf springs 134, and resilient connectors 136, integrally formed, e.g., integrally molded, of or in the inline slider seat 114. Where equipped with a plurality of the pawls 128, the pawls 128 preferably are disposed on opposite sides of the generally circular toothed ratchet gear 122 to provide positive engagement therebetween producing a durable resilient and reliable ratchet 130 having smooth ratcheting action during lumbar adjustment.

Figure 4:
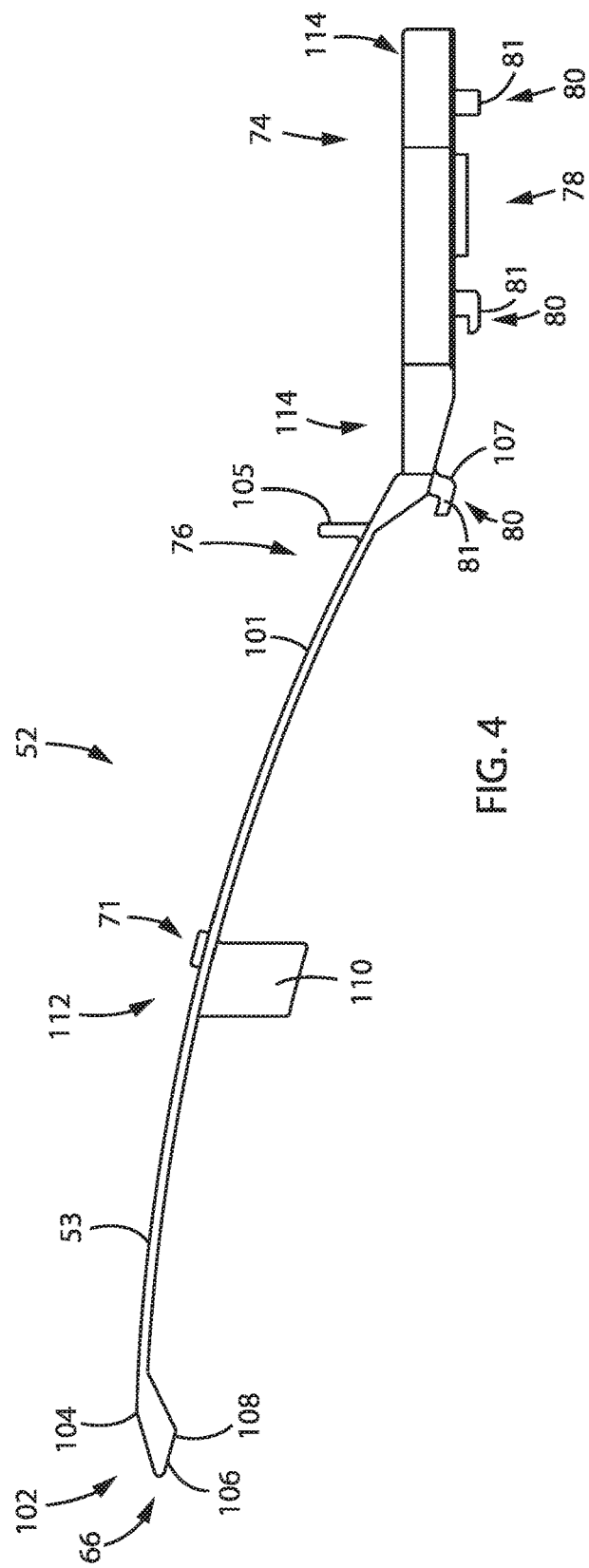
FIG. 4 is an enlarged side elevation view of a selectively flexible beam spring and beam flexure controlling drive carriage of the adjustable seat occupant support assembly of FIG. 1.
Figure 5:
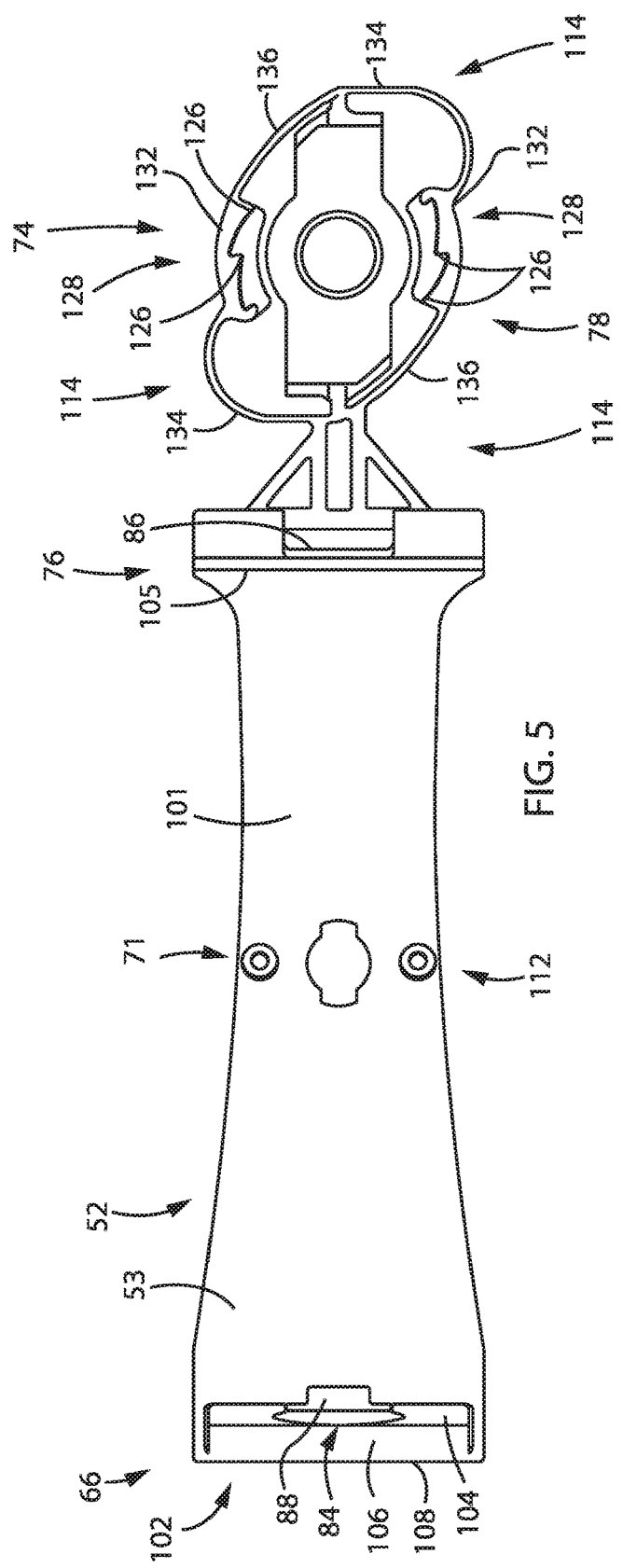
FIG. 5 is an enlarged top plan view of the beam spring and drive carriage of FIG. 4.

With additional reference to FIG. 4, the crank wheel 120, i.e., ratchet gear 122, can and preferably also does have an axially outwardly extending crank pin 135 spaced radially outwardly of an axially oppositely outwardly extending central hub 133 about which the wheel 120, e.g., ratchet gear 122, rotates during operation of the crank 118 during lumbar adjustment. The central hub 133 extends outwardly in a direction opposite the crank pin 135 through an opening 137 (FIG. 2) in the seat frame or pan 44 and engages the handle 60, such as a manually operated rotary knob 62, secured to the crank wheel 120, e.g., ratchet gear 122, by a fastener 138, e.g., threaded screw or bolt. The crank pin 135 is attached to one end of the beam spring flexor 64 such that turning the knob 62 during lumbar adjustment rotates the wheel 120, e.g., ratchet gear 122, reciprocating the beam spring flexor 64 back and forth alternately shortening and lengthening an effective length of the beam spring 52 correspondingly changing the amount of prominence, flexure and lumbar support provided by the beam spring 52.

In a preferred embodiment, the beam spring flexor 64 is an elongate beam spring flexing strap 100 of substantially straight construction that is resilient and somewhat flexible having a shape memory that returns to a substantially straightened condition after being slightly flexed or bent during lumbar adjustment operation. The strap 100 functions as an elongate connecting link 90 connecting the lumbar adjustment drive 56 to the proximal end 76 of the beam spring 52 in a manner where displacement of the strap 100, e.g., link 90, changes the magnitude of flexure of the beam spring 52 in adjusting the amount of support provided thereby.

The strap 100 has a lengthwise or longitudinal extent oriented generally parallel to the lengthwise or longitudinal extent of the beam spring 52 extending longitudinally alongside the beam spring 52, preferably slidably received in and guided by beam spring flexor guides 86, 88 of beam spring flexor guide arrangement 84 of the beam spring 52, connecting the proximal end 76 of the beam spring 52 to part of the drive 56, preferably to part of the crank 118, preferably to rotary crank wheel 120, e.g., ratchet gear 122. When the knob 62 is turned by a seat occupant performing lumbar support adjustment, the drive 56 causes the strap 100 to be displaced, e.g., reciprocated, relative to the beam spring 52 changing the effective length of the beam spring 52 thereby changing the amount of prominence or flexure of the beam spring 52 which in turn adjusts the amount of lumbar support provided. Where equipped with a crank 118 having a rotary crank wheel 120, e.g., ratchet gear 122, whose rotation reciprocates the strap 100, rotation of the knob 62 turns the wheel 120 displacing the strap 100 relative to the beam spring 52 changing the amount of flexure or prominence of the beam spring 52.

The beam spring flexing strap 100 is attached at one end, e.g. proximal end 92, to part of the crank 118, such as to a moving or movable part of the crank 118, preferably rotary crank wheel 120, e.g., ratchet gear 122, and attached at an opposite strap end, e.g., distal end 94, to the distal end 66 of the beam spring 52. The strap 100 has a crank coupler 140, preferably a connector loop 142, at one end, e.g., proximal end 92, which encircles and rotatively receives the pin 135 of the rotary crank wheel 120, e.g., ratchet gear 122, and has a beam coupler 144 at an opposite strap end, e.g., distal end 94, received in seat 102 formed in the distal end 66 of the beam spring 52. The beam coupler 144 is a generally transversely outwardly extending generally T-shaped trunnion 98 formed at or adjacent the distal end 94 of the strap 100 that is larger or wider than the distal end guide slot 88 formed at or adjacent the distal end of the beam spring 52 providing an interference fit therebetween.

In performing lumbar support adjustment using the lumbar adjustment assembly 42 shown in FIGS. 1-6, turning the knob 62 rotates the crank wheel 120, i.e., ratchet gear 122, up to and even beyond 360 degrees turning the crank 118 of the inline slider crank mechanism 116 moving the strap 100, i.e., beam spring flexor 64, relative to the beam spring 52 in a back-and-forth direction reciprocating the strap 100. As the strap 100 is reciprocated by crank rotation of the inline slider crank mechanism 116, movement of the strap 100 relative to the beam spring 52 either shortens the effective length of the beam spring 52 increasing beam spring flexure, prominence and amount of lumbar support provided to a seat occupant, or lengthens the effective length of the beam spring 52 decreasing beam spring flexure, prominence and the amount of lumbar support provided to a seat occupant. When the knob 62 is released, the ratchet 130 releasably holds the crank wheel 120, i.e., ratchet gear 122, in its present position maintaining the desired lumbar adjustment.

With specific reference to FIG. 6, as the crank wheel 120 of the inline slider mechanism 116 is turned, the crank pin 135 rotates orbiting the central hub of the wheel 120 reciprocating the strap 100 between Bottom Dead Center where the strap 100 is disposed in a substantially fully extended position such that flexure of the beam spring 52 is at a minimum, i.e., minimum prominence, and Top Dead Center where the strap 100 is disposed in a substantially fully retracted position such that flexure of the beam spring 52 is at a maximum, i.e., maximum prominence. During displacement of the strap 100 relative to the beam spring 52 in one direction in a manner that decreases effective beam spring length during lumbar support adjustment, the trunnion 98 of the strap 100 abuts against part of the seat 102 displacing, e.g., pulling, the distal end 66 of the beam spring 52 and distal end 94 of the strap 100 substantially in unison shortening effective beam spring length and increasing the amount of flexure or prominence of the beam spring 52. During displacement of the strap 100 relative to the beam spring 52 in an opposite direction in a manner that increases effective beam spring length during lumbar support adjustment, flexure present in the beam spring 52 captured in compression by the strap 100 maintains engagement between seat 102 and the trunnion 98 of the strap 100 during relative strap displacement controllably decreasing the amount of flexure present in the beam spring 52 as effective beam spring length increases. Where the inline slider mechanism 116 is equipped with a ratchet 130, such as when the crank wheel 120 also is a ratchet gear 122 that engages one or more ratchet pawls 128 of the drive carriage 74, releasing the knob 62 maintains the present lumbar adjustment setting by preventing inadvertent rotation of the crank wheel 120.

FIGS. 7-16 depicts a second preferred embodiment of an adjustable seat occupant support assembly 40' that preferably also is well suited for use as an adjustable lumbar assembly 42' which employs an inline slider mechanism 58' that is an inline slider cam-follower mechanism 146 instead of the in-line slider crank mechanism 116 of the adjustable seat occupant support assembly 40 shown in FIGS. 1-6. The inline slider cam-follower mechanism 146 has a rotary cam 148 with a radially varied or contoured outer peripheral cam profile 150 that is received in and bounded by a translating follower yoke 152 forming part of the drive carriage 74 with the yoke 152 having a generally planar floor 154 received on or in seat 114' upon which the cam 148 is slidably rotatively supported and bounded by an outwardly extending yoke sidewall 156 having a translating follower 158 extending radially inwardly that rides or follows the profile 150 of the cam 148 during cam rotation during lumbar adjustment.

The beam spring flexor 64 extends outwardly from the follower yoke 152, preferably extending generally transversely outwardly from the yoke sidewall 156, such that translation of the yoke 152 by cam rotation correspondingly displaces, e.g. reciprocates, the beam spring flexor 64. If desired, the yoke 152 and beam spring flexor 64 can be formed of one-piece, unitary and substantially homogenous construction such as by being molded from or of one piece of plastic or the like.

The yoke 152 preferably is round or circular with the yoke sidewall 156 being a circular sidewall that substantially completely or completely encircles the outer periphery or profile 150 of the cam 148. The translating follower 158 projects radially inwardly from the yoke sidewall 156 and preferably is a spherical follower 160 having a rounded or generally spherical outer follower surface 162 that rides against the cam 148. The translating follower 158 preferably also has a cam guide or retainer tab 164 that overlies an outer generally planar surface 166 of the cam 148 slidably rotatively guiding the cam 148 while capturing the cam 148 between the tab 164 and yoke floor 154.

The cam 148 has an axially extending hub 168 that couples with the handle 60, preferably knob 62, during assembly for rotation substantially in unison therewith. The cam 148 has a stepped radially contoured outer cam profile 150 configured to provide at least a plurality of pairs, i.e., at least three, of circumferentially spaced apart recessed or concave lumbar adjustment setting stops 170, 172, 174, 176 and 178 respectively having circumferentially spaced apart progressively increasing radial extents that provide a corresponding plurality of pairs, i.e., at least three, of discrete rotatively spaced apart lumbar adjustment positions 178 (FIG. 12), 180 (FIG. 13), 182 (FIG. 14), 183 (FIG. 15) and 185 (FIG. 16) during operation. As the handle 60, e.g., knob 62 (not shown in FIGS. 12-16) is turned in a direction causing the cam 148 to rotate clockwise, the follower 158 translates the yoke 152 slidably relative to seat 114' away from the proximal end 76 of the beam spring 52 thereby shortening the effective length of the beam spring 52 increasing beam spring flexure and prominence as well as lumbar adjustment firmness. Each stop 170, 172, 174, 176 and 178 provides a detent that transmits a click or provides other, e.g., frictional resistance, feedback to a seat occupant performing lumbar adjustment to additional cam rotation and knob turning during lumbar adjustment preferably releasably retaining the cam 148 in the position of the stop 170, 172, 174, 176 and/or 178 occupied by the follower 158 when the knob 62 is released. While the cam 148 can be configured to rotate 360 degrees or more without stopping, the cam 148 preferably also is configured with a pair of circumferentially spaced apart rotation stops 180 and 182 that limit rotation to greater than 180 degrees but less than 360 degree, preferably no more than about 200 to 210 degrees.

The drive carriage 74' that extends outwardly from the proximal end 76 of the beam spring 52 has an inline slider seat 114' that is generally flat or planar providing a flat generally planar follower slide surface 184 along which the bottom or floor 154 of the follower yoke 152 can slidably reciprocate during lumbar adjustment. The bottom or floor 154 of the follower yoke 152 has a pair of spaced apart elongate, generally straight, and outwardly extending reciprocating yoke motion guide flanges 186, 188 that ride along opposite elongate substantially straight side edges 190, 192 of the slider seat 114' with the slider seat 114' defining a track along with the yoke 152 slidably displaces, e.g., slidably reciprocates, during lumbar adjustment. The beam spring flexor guide arrangement 84 preferably also includes an intermediate guide 87, preferably a guide slot or guide channel 89, formed in the beam spring support 110' underlying the generally central portion 112 of the beam spring 52 and disposed between the distal and proximal ends 66, 76 of the beam spring 52.

Figure 7:
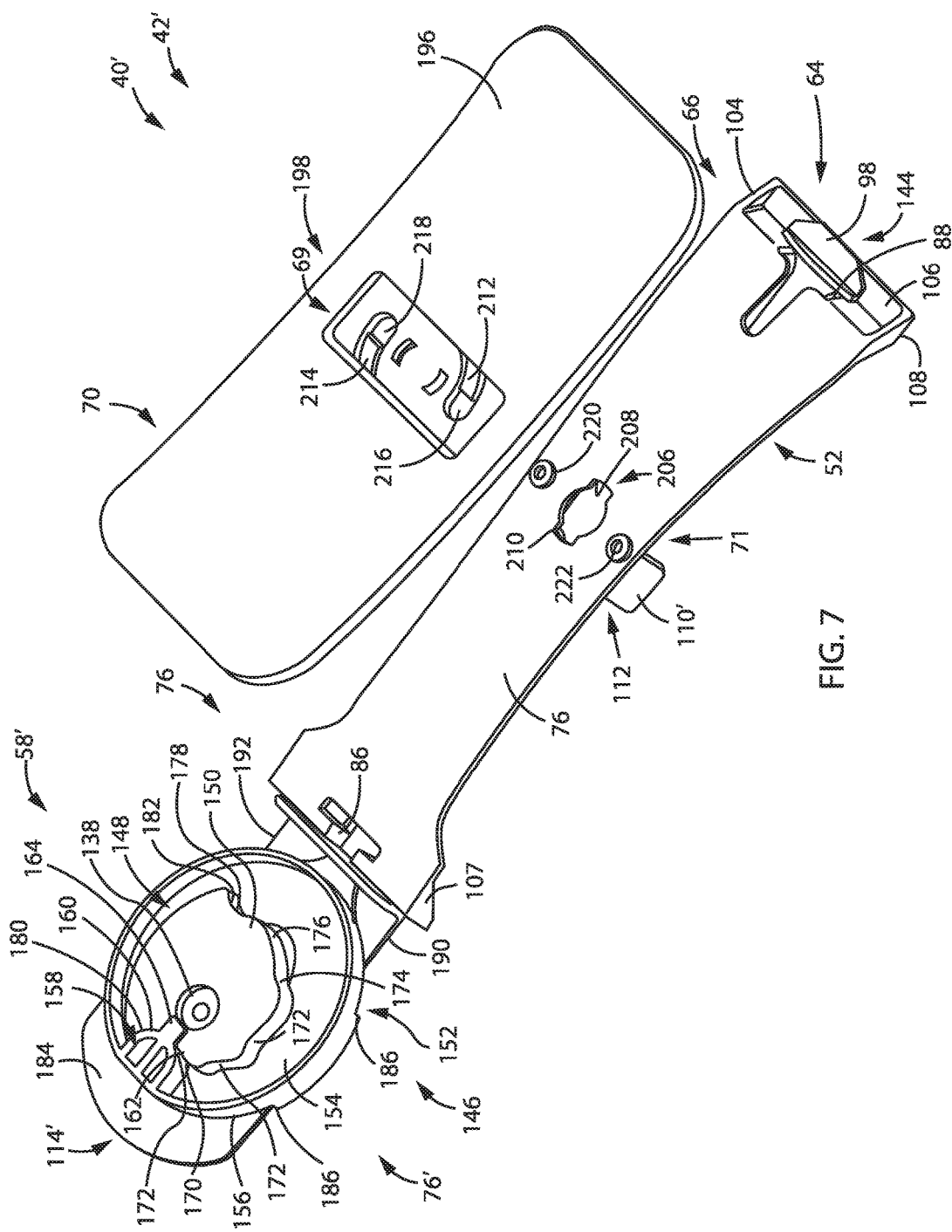
FIG. 7 is a top front perspective partially exploded view of a second preferred embodiment of an adjustable seat occupant support assembly configured for providing lumbar support that employs an inline slider cam-follower mechanism.
Figure 8:
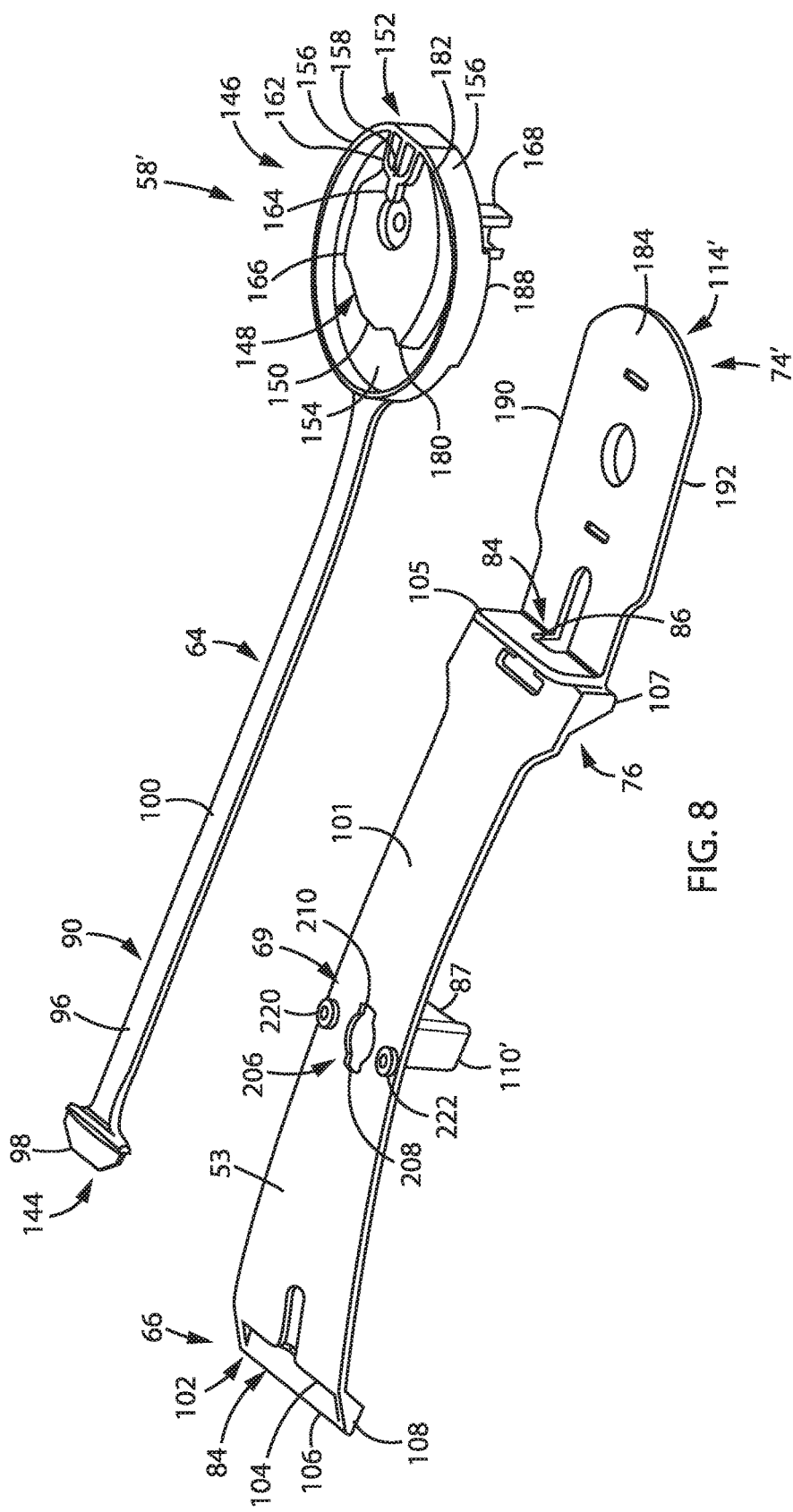
FIG. 8 is an exploded perspective view of the beam spring and drive carriage alongside the inline slider cam-follower mechanism of the adjustable seat occupant support assembly of FIG. 7.
Figure 9:
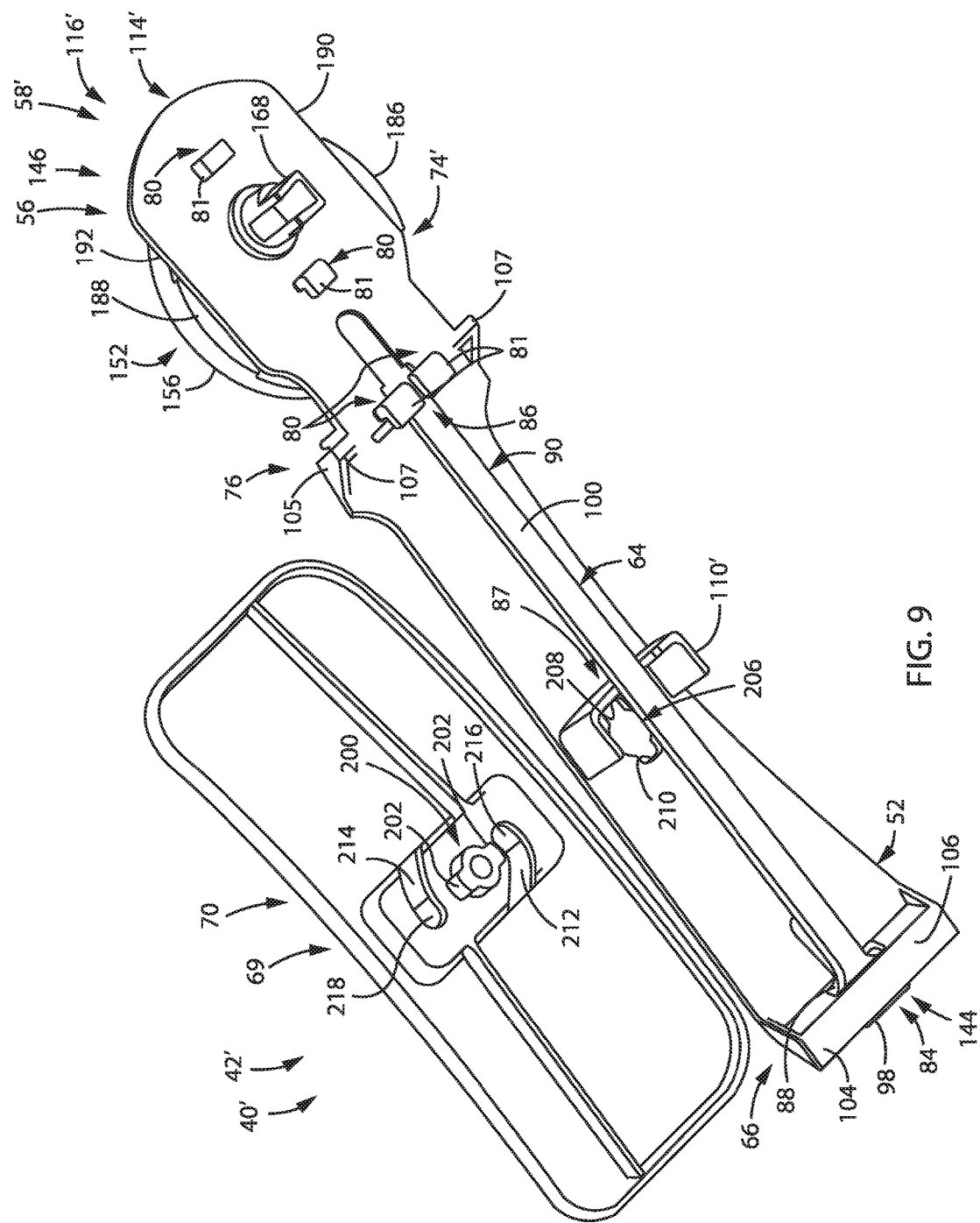
FIG. 9 is a rear partially exploded perspective view of the adjustable seat occupant support assembly of FIG. 7.
Figure 10:
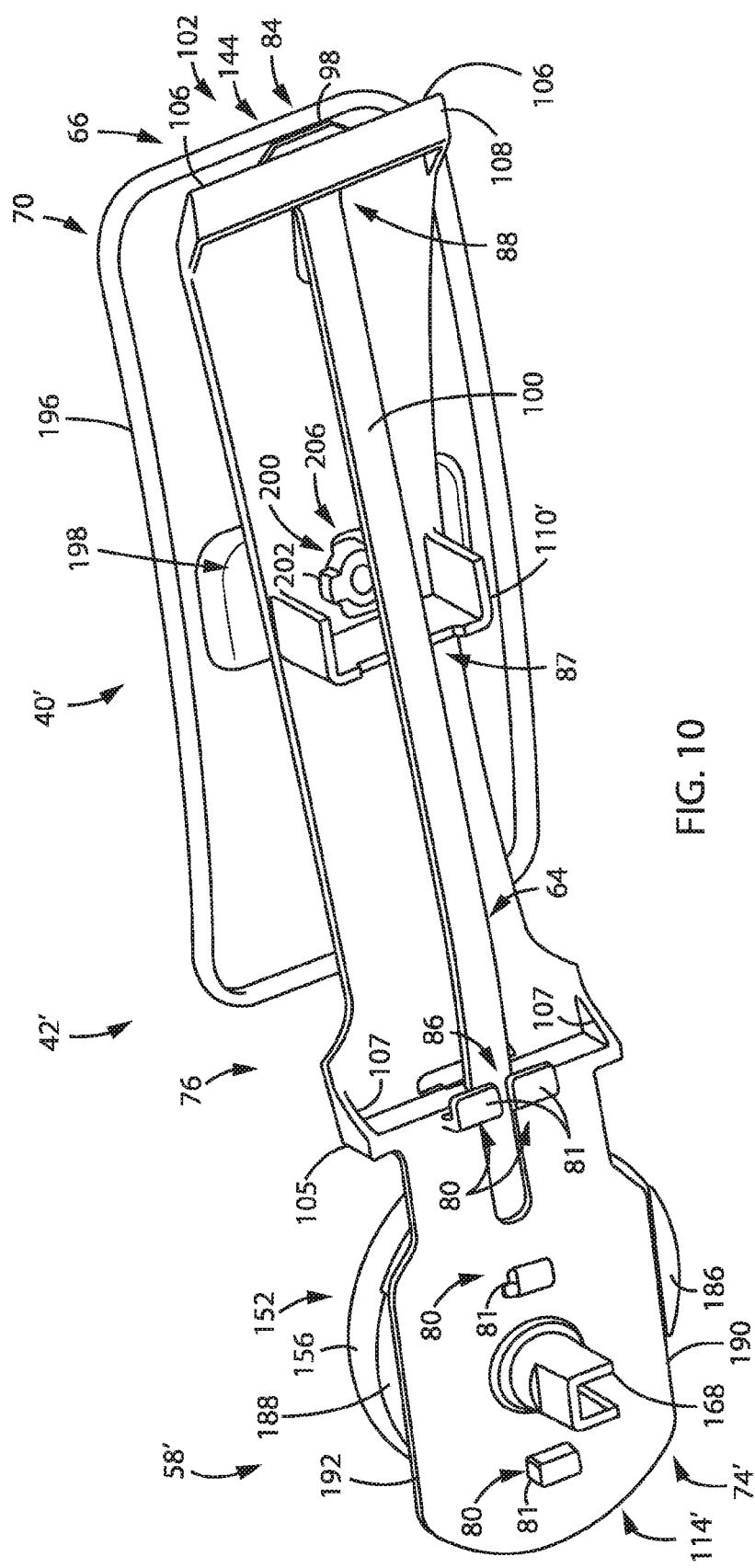
FIG. 10 is a rear perspective view of the adjustable seat occupant support assembly of FIG. 7.
Figure 11:
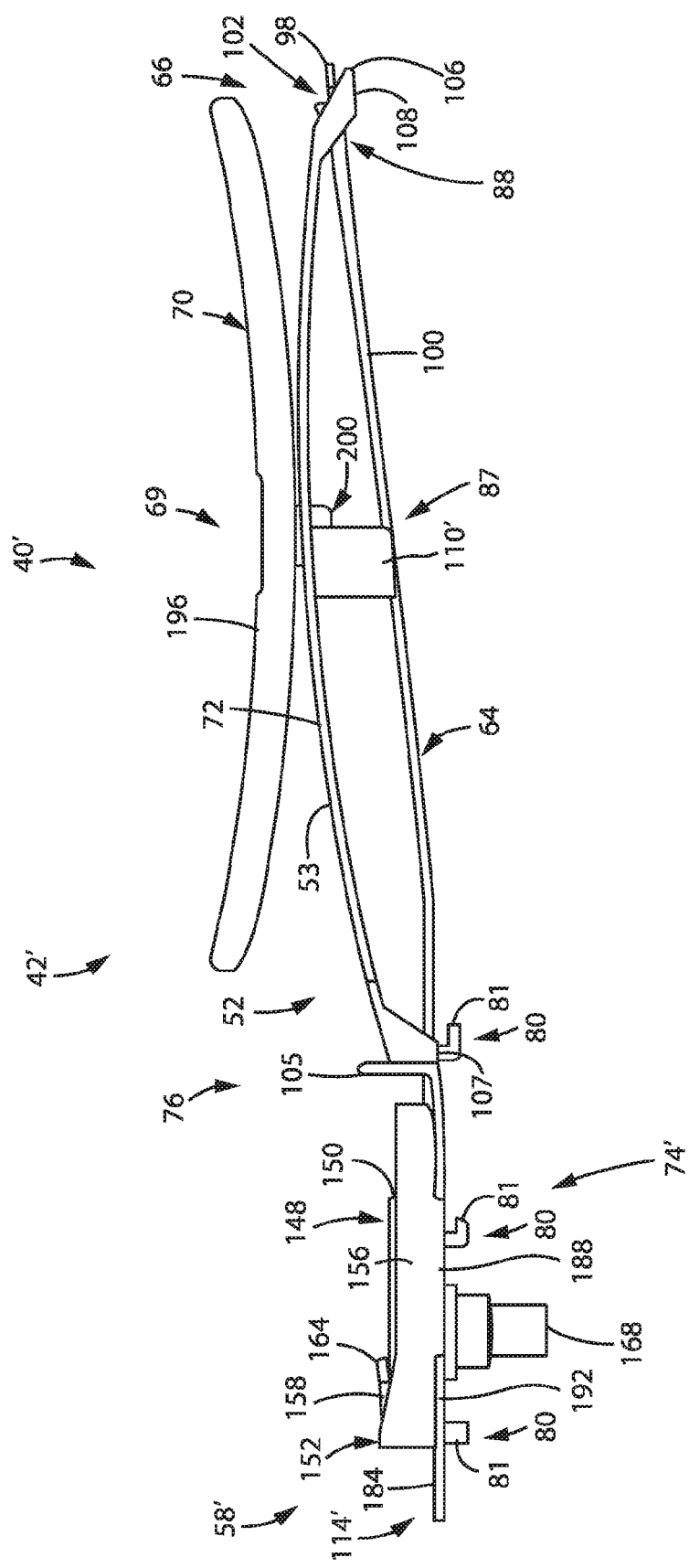
FIG. 11 is a side elevation view of the adjustable seat occupant support assembly of FIG. 7.
Figure 12:
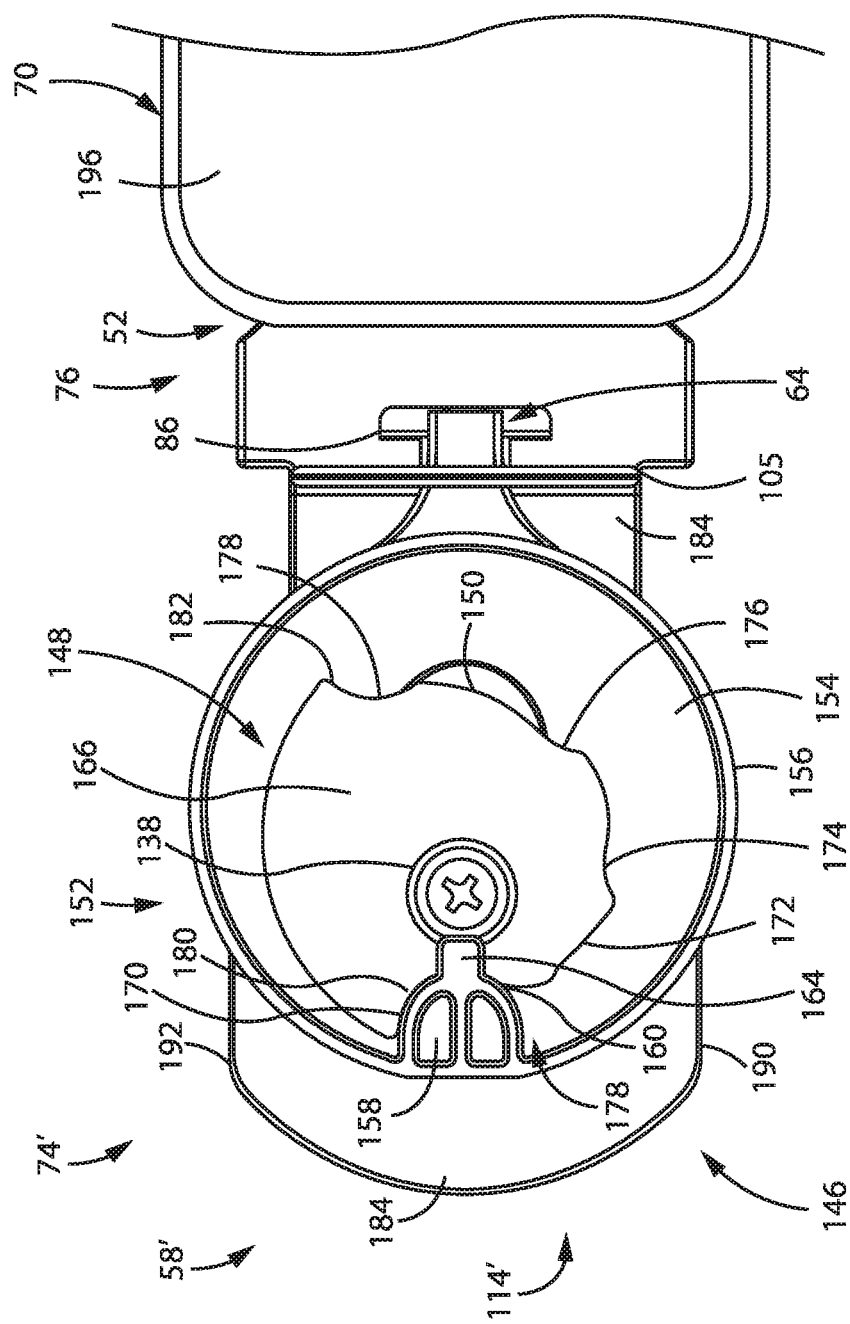
FIG. 12 is a first fragmentary front elevation view of the inline slider cam-and-follower mechanism depicting a reciprocable beam flexor used to change beam spring flexure during adjustment in a first position that is a fully extended disposing the beam spring in a position of minimum prominence or flexure.
Figure 13:
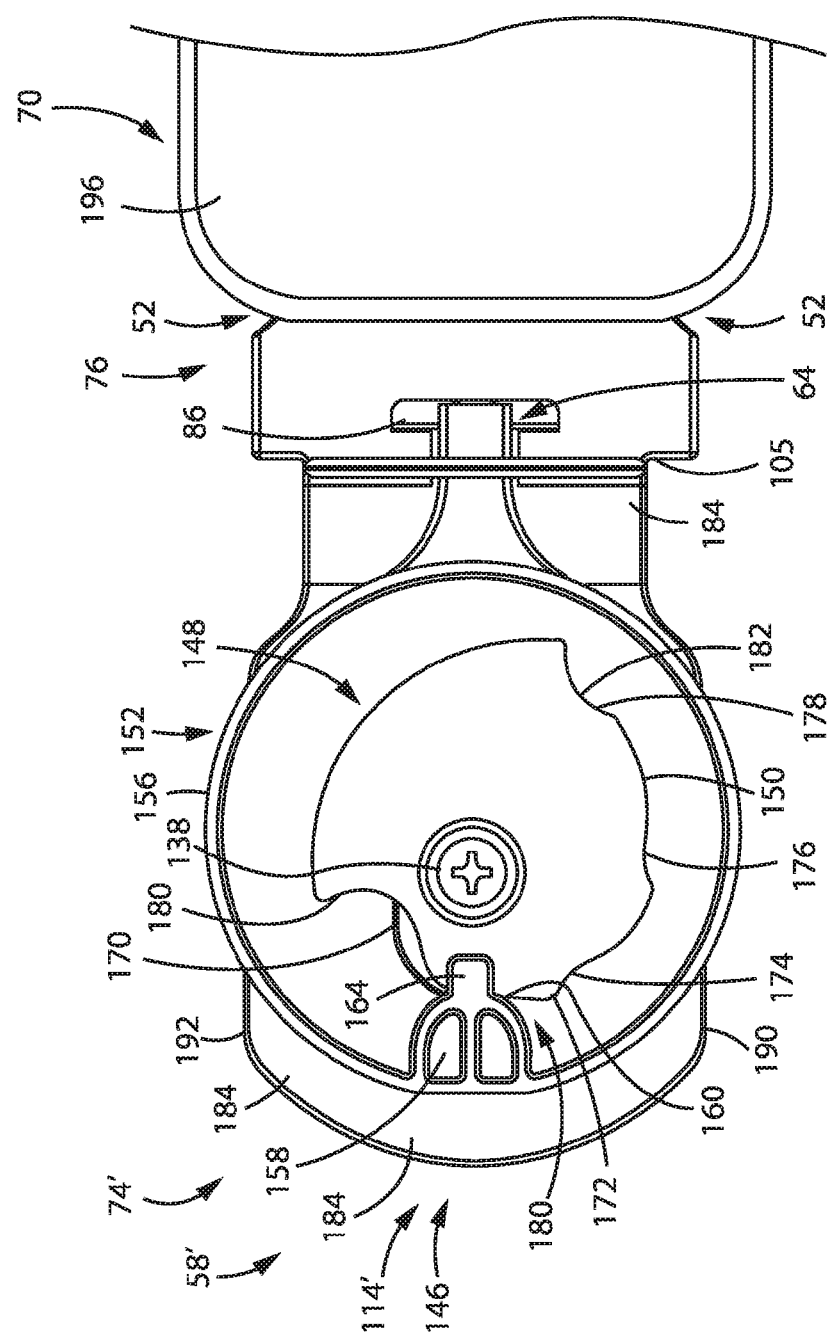
FIG. 13 is a second fragmentary front elevation view of the inline slider cam-and-follower mechanism depicting the reciprocable beam flexor in a second position displaced away from the fully extended position shortening the effective length of the beam spring increasing beam spring flexure, prominence, and the amount of support provided by the beam spring to a seat occupant.

The load spreading plate 70 has a concave outer lumbar supporting surface 196 that faces outwardly away from the convex curved outer surface 72 of the beam spring 52. With reference to FIGS. 7, 9 and 10, the plate 70 has a coupling 69 that preferably is a twist-lock coupling 198 having an outwardly extending male T-shaped bow-tie coupling key 200 with oppositely outwardly extending locking ears 202, 204 are received in a complementarily shaped socket 206 with oppositely outwardly extending keyholes 208, 210 formed in the beam spring 52 during attachment of the plate 70 to the beam spring 52. When the coupling key 200 of the plate 70 is inserted into the socket 206 and rotated, the oppositely outwardly spaced ears 202, 204 of the key 200 rotate into engagement with part of the beam spring 52 such as is depicted in FIG. 10 providing a friction fit therebetween that can be an interference fit. To help oppose rotation in an opposite direction and prevent disengagement of the plate 70 from the beam spring 52, the plate 70 has a pair of curved resilient twist-lock coupling retainer fingers 212, 214 on opposite sides of the key 200 that each terminate forming a twist-lock coupling retainer boss receptacle 216, 218 for receiving and retaining a corresponding one of a pair of spaced apart outwardly extending upraised coupling retaining bosses 220, 222. When the key 200 of the plate 70 is inserted into the socket 206 in the beam spring 52 and the plate 70 rotated relative to the beam spring 52, each boss 220, 222 cams along a corresponding one of the retainer fingers 212, 214 until being received in a respective one of the boss receptacles 216, 218 causing abutment between each boss 220, 222 and the free end of a corresponding one of the retainer fingers 212, 214 opposing disengagement of the plate 70 from the beam spring 52 by preventing relative rotation therebetween.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the claimed invention.

What is claimed is:

1. An adjustable seat support assembly comprising:
   an elongate flexible beam spring having a flexure that changes when an effective length of the beam spring is changed, the beam spring having a proximal end and a distal end and being defined by an elongate body that extends along a longitudinal axis between the proximal end and the distal end and that is deflectable and non-compressible relative to the longitudinal axis of the elongate body; and
   an actuator that changes the flexure of the beam spring by changing the effective length of the beam spring, the actuator comprising an inline slider mechanism disposed at the proximal end of the beam spring, an elongate substantially rigid beam spring flexor extending outwardly from the inline slider mechanism longitudinally alongside the beam spring from the proximal end of the beam spring to the distal end of the beam spring, the beam spring flexor connected to the distal end of the beam spring and displaced by the inline slider mechanism longitudinally relative to the beam spring to change the amount of flexure of the beam spring in adjusting an amount of support provided by the beam spring to a seat occupant.

2. The adjustable seat support assembly of claim 1 wherein the beam spring flexor comprises an elongate substantially rigid plastic strap that is slidably coupled to the distal end of the beam spring.

3. The adjustable seat support assembly of claim 1 wherein the beam spring has a beam spring flexor guide arrangement formed therein that slidably guides movement of the beam spring flexor relative to the beam spring in changing an effective length of the beam spring in changing beam flexure.

4. The adjustable seat support assembly of claim 3 wherein the guide arrangement comprises a pair of spaced apart beam flexor guides formed in the beam spring, with one of the beam flexor guides disposed at the proximal end of the beam spring and the other one of the beam flexor guides disposed at the distal end of the beam spring.

5. The adjustable seat support assembly of claim 4 wherein each one of the beam flexor guides comprises one of a guide slot and guide channel.

6. The adjustable seat support assembly of claim 1 wherein the inline slider mechanism is disposed in line with the longitudinal axis of the beam spring that displaces the beam spring flexor relative to the beam spring to change the effective length of the beam spring and the amount of flexure of the beam spring.

7. The adjustable seat support assembly of claim 1 wherein the inline slider mechanism comprises an inline slider crank mechanism having a rotary crank that displaces the beam spring flexor when the rotary crank is rotated.

8. The adjustable seat support assembly of claim 7 wherein the rotary crank comprises a ratchet gear.

9. The adjustable seat support assembly of claim 1 wherein the inline slider mechanism comprises an inline slider cam-follower mechanism having a rotary cam that displaces a follower yoke riding on the cam, the beam spring flexor extending outwardly from the follower yoke displacing the beam spring flexor substantially in unison with displacement of the follower yoke.

10. The adjustable seat support assembly of claim 9 wherein the follower yoke is slidably coupled to a seat extending outwardly from the proximal end of the beam spring.

11. The adjustable seat support assembly of claim 10 wherein the follower yoke has a sidewall bounding the cam with a follower radially inwardly extending from the yoke sidewall that rides along an outer profile of the cam.

12. The adjustable seat support assembly of claim 11 wherein the cam has a radially stepped profile with a plurality of circumferentially spaced apart stops which releasably receive and retain the follower therein in a discrete beam spring adjustment position.

13. The adjustable seat support assembly of claim 1 wherein the actuator further comprises a rotatable crank in operable cooperation with the beam spring that changes the amount of flexure of the beam spring in response to rotation of the crank.

14. The adjustable seat support assembly of claim 13 wherein the beam spring flexor is operatively connected to the crank at one end of the beam spring flexor and operatively connected to the beam spring at an opposite end of the beam spring flexor, and wherein rotation of the crank causes the beam spring flexor to change the flexure of the beam spring.

15. The adjustable seat support assembly of claim 14 wherein rotation of the crank displaces the beam spring flexor relative to the beam spring changing the effective length and flexure of the beam spring.

16. The adjustable seat support assembly of claim 14 wherein the beam spring flexor is displaced by rotation of the crank and wherein displacement of the beam spring flexor changes the flexure of the beam spring.

17. The adjustable seat support assembly of claim 16 wherein the beam spring flexor comprises a substantially rigid flexible strap having one end slidably coupled to the distal end of the beam spring and an opposite end pivotally connected to the crank.

18. The adjustable seat support assembly of claim 1 wherein the beam spring has a drive carriage disposed at the proximal end thereof, the drive carriage carrying the actuator.

19. The adjustable seat support assembly of claim 18 wherein the drive carriage comprises a mount configured for snap fit attachment to part of a seat.

20. The adjustable seat support assembly of claim 18 wherein the drive carriage has (a) an in-line slider seat in line with the beam spring, and (b) an in-line cam-follower mechanism with a cam rotatively received in a translating follower yoke slidably coupled to the in-line slider seat whose slidable movement relative to the in-line slider seat in response to cam rotation displaces the beam spring flexor relative to the beam spring changing flexure of the beam spring.

21. The adjustable seat support assembly of claim 18 wherein the actuator further comprises a rotary crank drive carried by the drive carriage, the rotary crank operatively connected to the link, and rotation of the rotary crank displacing the link to change the flexure of the beam spring.

22. An adjustable seat support assembly comprising:
an elongate flexible beam spring having a flexure that changes when an effective length of the beam spring is changed, the beam spring have a proximal end and a distal end; and
an actuator that changes the flexure of the beam spring by changing the effective length of the beam spring, the actuator comprising an inline slider mechanism disposed at the proximal end of the beam spring, an elongate substantially rigid beam spring flexor extending outwardly from the inline slider mechanism longitudinally alongside the beam spring from the proximal end of the beam spring to the distal end of the beam spring, the beam spring flexor connected to the distal end of the beam spring and displaced by the inline slider mechanism longitudinally relative to the beam spring to change the amount of flexure of the beam spring in adjusting an amount of support provided by the beam spring to a seat occupant; and
wherein the inline slider mechanism comprises at least one of an inline slider crank mechanism having a rotary crank that displaces the beam spring flexor when the rotary crank is rotated and an inline slider cam-follower mechanism having a rotary cam that displaces a follower yoke riding on the cam, the beam spring flexor extending outwardly from the follower yoke displacing the beam spring flexor substantially in unison with displacement of the follower yoke.

23. The adjustable seat support assembly of claim 22 wherein the rotary crank further comprises at least one of a ratchet gear when the inline slider mechanism includes the inline slider crank mechanism and the follower yoke is slidably coupled to a seat extending outwardly from the proximal end of the beam spring when the inline slider mechanism includes the inline slider cam-follower mechanism.

24. The adjustable seat support assembly of claim 23 wherein the follower yoke has a sidewall bounding the cam with a follower radially inwardly extending from the yoke sidewall that rides along an outer profile of the cam when the inline slider mechanism includes the inline slider cam-follower mechanism.

25. An adjustable seat support assembly comprising:
an elongate flexible beam spring having a flexure that changes when an effective length of the beam spring is changed, the beam spring have a proximal end and a distal end; and
an actuator that changes the flexure of the beam spring by changing the effective length of the beam spring, the actuator comprising an inline slider mechanism disposed at the proximal end of the beam spring, an elongate substantially rigid beam spring flexor extending outwardly from the inline slider mechanism longitudinally alongside the beam spring from the proximal end of the beam spring to the distal end of the beam spring, the beam spring flexor connected to the distal end of the beam spring and displaced by the inline slider mechanism longitudinally relative to the beam spring to change the amount of flexure of the beam spring in adjusting an amount of support provided by the beam spring to a seat occupant; and wherein the actuator further comprises a rotatable crank in operable cooperation with the beam spring that changes the amount of flexure of the beam spring in response to rotation of the crank.

26. The adjustable seat support assembly of claim 25 wherein the beam spring flexor is operatively connected to the crank at one end of the beam spring flexor and operatively connected to the beam spring at an opposite end of the beam spring flexor, and wherein rotation of the crank causes the beam spring flexor to change the flexure of the beam spring.

27. The adjustable seat support assembly of claim 26 wherein at least one of rotation of the crank displaces the beam spring flexor relative to the beam spring changing the effective length and flexure of the beam spring and wherein the beam spring flexor is displaced by rotation of the crank and wherein displacement of the beam spring flexor changes the flexure of the beam spring.

28. The adjustable seat support assembly of claim 27 wherein the beam spring flexor comprises a substantially rigid flexible strap having one end slidably coupled to the distal end of the beam spring and an opposite end pivotally connected to the crank.

29. An adjustable seat support assembly comprising:
an elongate flexible beam spring having a flexure that changes when an effective length of the beam spring is changed, the beam spring have a proximal end and a distal end; and
an actuator that changes the flexure of the beam spring by changing the effective length of the beam spring, the actuator comprising an inline slider mechanism disposed at the proximal end of the beam spring, an elongate substantially rigid beam spring flexor extending outwardly from the inline slider mechanism longitudinally alongside the beam spring from the proximal end of the beam spring to the distal end of the beam spring, the beam spring flexor connected to the distal end of the beam spring and displaced by the inline slider mechanism longitudinally relative to the beam spring to change the amount of flexure of the beam spring in adjusting an amount of support provided by the beam spring to a seat occupant; and
a drive carriage carrying the actuator and disposed at the proximal end of the beam spring, and wherein at least one of:
the drive carriage having (a) an in-line slider seat in line with the beam spring, and (b) an in-line cam-follower mechanism with a cam rotatively received in a translating follower yoke slidably coupled to the in-line slider seat whose slidable movement relative to the in-line slider seat in response to cam rotation displaces the beam spring flexor relative to the beam spring changing flexure of the beam spring; and
the actuator further comprises a rotary crank drive carried by the drive carriage, the rotary crank operatively connected to the link, and rotation of the rotary crank displacing the link to change the flexure of the beam spring.

30. The adjustable seat support assembly of claim 29 wherein the drive carriage comprises a mount configured for snap fit attachment to part of a seat.

* * * * *